United States Patent [19]

Tsuchiya et al.

[11] Patent Number: 5,780,810
[45] Date of Patent: Jul. 14, 1998

[54] ALTERNATOR POWER SUPPLIED ELECTRIC HEATER

[75] Inventors: Kenichi Tsuchiya, Kobe; Tadashi Tsubakiji; Toru Fujiwara, both of Tokyo, all of Japan

[73] Assignee: Mitsubishi Denki Kabushiki Kaisha, Tokyo, Japan

[21] Appl. No.: 558,536

[22] Filed: Nov. 16, 1995

[30] Foreign Application Priority Data

Nov. 24, 1994 [JP] Japan .................. 6-289892

[51] Int. Cl.[6] .............. B60M 3/00; B60S 1/02; F01N 3/28
[52] U.S. Cl. .................................... 219/202
[58] Field of Search ........................ 219/202, 509, 219/203; 361/1; 307/10.1; 340/438; 237/28, 12.38

[56] References Cited

U.S. PATENT DOCUMENTS

| | | | |
|---|---|---|---|
| 4,084,126 | 4/1978 | Clements | 219/202 |
| 4,423,307 | 12/1983 | Kondo et al. | 219/202 |
| 5,025,136 | 6/1991 | Doege et al. | 219/202 |
| 5,068,589 | 11/1991 | Offilerr et al. | 219/202 |
| 5,072,098 | 12/1991 | Matthews et al. | 219/501 |
| 5,095,222 | 3/1992 | Pierret et al. | 307/10.1 |
| 5,107,094 | 4/1992 | Kuhn et al. | 307/10.1 |
| 5,187,349 | 2/1993 | Curhan et al. | 219/202 |
| 5,404,720 | 4/1995 | Laing | 60/284 |
| 5,501,267 | 3/1996 | Iritani et al. | 165/202 |
| 5,512,789 | 4/1996 | Lyon | 219/202 |
| 5,645,745 | 7/1997 | Hartwick et al. | 219/202 |

FOREIGN PATENT DOCUMENTS 1483033  8/1977  United Kingdom.

Primary Examiner—John A. Jeffery
Attorney, Agent, or Firm—Sughrue, Mion, Zinn, Macpeak & Seas, PLLC

[57] ABSTRACT

An alternator power supplied electric heater is Where the resistance of a resistive heater element 3, consumed power and amount of consumed power are calculated from non-controlled characteristics of an alternator 2, and supply of power to the resistive heater element 3 is controlled based on water temperature of engine WT to heat catalyst 11b to a predetermined temperature.

11 Claims, 5 Drawing Sheets

ALTERNATOR POWER SUPPLIED ELECTRIC HEATER

BACKGROUND OF THE INVENTION

1. Field of the Invention

The invention relates to an alternator power supplied electric heater, and, more particularly, to an alternator power supplied electric heater which electrically isolates an alternator and a battery, connects the alternator and a resistive heater element in series to supply electric power to the resistive heater at a high voltage, and electrically heats an object to be heated such as catalyst a in a short period of time.

2. Description of the Prior Art

Japanese Patent Application Publication No. 61-33735 has been known as an alternator power supplied electric heater which supplies electric power to a resistive heater element at a high voltage to heat an object to be heated such as window glass. This connects a switch device between the alternator, and a battery and the resistive heater element, and obtains the high voltage for the resistive heater element and a low voltage for the battery by opening and closing the switch device.

FIG. 5 is a circuit diagram of such conventional alternator power supplied electric heater. As shown in the figure, the conventional alternator power supplied electric heater comprises a battery 1, an alternator 2 containing a field coil 2a, a rectifying device 2b and a rotor 2c, a resistive heater element 3, a switch 4 electrically connecting the resistive heater element 3 and the alternator 2, switches 5a and 5b electrically connecting the battery 1 and the alternator 2, a regulator 6 for regulating charging voltage of the alternator, a control circuit 7 for opening and closing the switches 5a and 5b, a switch 8 issuing an opening/closing instruction to the control circuit 7, an ignition switch 9, a charge warning indicator 10 and window glass 11a being heated by the resistive heating element 3.

Now, the operation is described. When the switch 8 is closed after the switch 4 is manually closed to heat the window glass 11a, the control circuit 7 operates to open the switches 5a and 5b. At that moment, the regulator 6 enters non-controlled state. Thus, the resistive heater element 3 is connected to the alternator 2 in series. The power of the alternator 2 is determined by the number of engine rotations and the resistance value of the resistive heater element, and entirely consumed by the resistive heater element 3. In addition, the resistive heater element 3 and the alternator 2 are connected for a predetermined period of time set by a timer circuit (not shown) in the control circuit 7.

SUMMARY OF THE INVENTION

In the conventional device as described above, because the interval when the resistive heater element is heated is set at a fixed value by the timer circuit in the control circuit 7, when the resistive heater element changes due to deterioration, high temperature, short-circuiting, or broken wire, or when the number of engine rotations Ne changes, the resistive heater element is not heated to an expected temperature so that the purpose of the high voltage resistive heater cannot be attained, or it is overheated so that the window glass 11a which is the object to be heated is caused to be deformed, deteriorated or broken.

In addition, because the resistive heater element 3 is connected to the alternator 2 for a fixed period of time regardless of the state of the battery 1, when the charging rate of the battery 1 is low, discharge is continued for a prolonged duration so that the battery 1 tends to be easily deteriorated.

Furthermore, prior art is also known in which the temperature of the object to be heated is measured by using a temperature sensor, and control is performed in accordance with the temperature. However, a sensor measuring high temperature is expensive so that measuring the object to be heated with the temperature sensor is expensive.

Furthermore, because the resistance value of the resistive heater element 3 cannot be measured by the conventional arrangement, failure of the resistive heater element cannot be determined so that there is such disadvantage that such failed state cannot be informed to a driver.

The invention is intended to solve such conventional problems, and to provide an alternator power supplied electric heater which can perform optimum heating at a low cost without using an expensive sensor such as a high temperature sensor. It also intended to provide an alternator power supplied electric heater which can determine failure of the resistive heater element and notify a driver of such failure. It is further intended to provide an alternator power supplied heater which can perform optimum heating even if the resistance value of the resistive heater element or the number of engine rotations changes.

According to one aspect of the invention, there is provided an alternator power supplied electric heater comprising an alternator mounted on a vehicle for supplying electric power to a battery or a vehicle mounted load, storage means for storing non-controlled characteristics of the alternator, a resistive heater element for electrically heating an object to be heated, voltage detection means for detecting the voltage of the resistive heater element, change-over means for changing over between a first state where the output of the alternator is connected to the battery and the vehicle mounted load, and a second state where the output of the alternator is connected to the resistive heating element In addition, the device number of rotation detection means for detecting the number of engine rotations that includes a, calculation means for determining, in the second state, consumed power of the resistive heater element from the voltage of the resistive heater element, the number of engine rotations, and the non-controlled characteristics of the alternator by causing the alternator to generate the power in the non-controlled state, and control means for controlling, in the second state, supply of the power to the resistive heater element based on the consumed power found by the calculation means so that the object to be heated is at a predetermined temperature. The calculation means calculates the consumed power of the resistive heater element from the voltage of the resistive heater element, the number of engine rotations and the non-controlled characteristics of the alternator, and the control means controls the supply of power to the resistive heater element so that the object to be heated is at the predetermined temperature.

According to another aspect of the invention, there is provided an alternator power supplied electric heater comprising an alternator mounted on a vehicle which supplies electric power to a battery or a vehicle mounted load, storage means for storing non-controlled characteristics of the alternator, a resistive heater element for electrically heating an object to be heated, the temperature of which can be estimated based on vehicle information, voltage detection means for detecting the voltage of the resistive heating element, change-over means for changing over between a first state where the output of the alternator is connected to the battery and the vehicle mounted load, and a second state where the output of the alternator is connected to the resistive heating element. In addition, the device includes number of rotation detection means for detecting the number of engine rotation, vehicle information detection means for detecting the vehicle information, calculation means for finding, in the second state, consumed power of the resistive heater element from the voltage of the resistive heater element, the number of engine rotations, and the non-controlled characteristics of the alternator by causing the alternator to generate the power in the non-controlled state, and control means for controlling, in the second state, supply of the power to the resistive heater element based on the consumed power found by the vehicle information and the calculation means so that the object to be heated is at a predetermined temperature. The calculation means calculates the consumed power the resistive heater element from the voltage of the resistive heater element, the number of engine rotations, and the non-controlled characteristics of the alternator, and the control means controls the supply of power to the resistive heater element based on the consumed power and the vehicle information so that the object to be heated is at the predetermined temperature.

In a preferred form of the invention, there is provided an alternator power supplied electric heater wherein the vehicle information is water temperature of the engine. The vehicle information is water temperature of the engine.

In another preferred form of the invention, there is provided an alternator power supplied electric heater wherein the object to be heated is a catalyst.

In a further preferred form of the invention, there is provided an alternator power supplied electric heater wherein the calculation means calculates resistance of the resistive heater element based on the non-controlled characteristics of the alternator and the voltage of the resistive heater element, and determines that the resistive heater element is failed if the resistance exceeds a predetermined range. According to this arrangement, the resistive heater element is determined to be failed if the resistance of the resistive heater element exceeds a predetermined range.

In a further preferred form of the invention, there is provided an alternator power supplied electric heater wherein, when the resistive heater element is determined to be failed, the change-over means changes over the alternator from the second state to the first state to control the alternator to. the generation amount corresponding to the battery. According to this arrangement, heating of the resistive heater element is stopped when it is determined to be failed.

In a further preferred form of the invention, there is provided an alternator power supplied electric heater wherein, when the resistive heater element is determined to be failed, warning means to warn the driver of the failure.

In a further preferred form of the invention, there is provided an alternator power supplied electric heater wherein, in the second state, the control means sets a target time based on the vehicle information, target power being calculated from the amount of power with which the resistive heater element reaches a target temperature in the target time, the number of engine rotations being controlled so that the consumed power of the resistive heater element is the target power. The device to be heated is at the predetermined temperature in the target time.

In a further preferred form of the invention, there is provided an alternator power supplied electric heater wherein the target time is corrected by the battery voltage. With this arrangement, it is possible to prevent the charging ratio of the battery from being lowered by correcting the target time with the battery voltage.

In a further preferred form of the invention, there is provided an alternator power supplied electric heater wherein the control means stops heating of the resistive heater element after the target time expires, and the change-over means changes over the alternator to the first state. The alternator can be automatically changed over to the first state after the target time expires, and, since then, the battery is charged.

In a further preferred form of the invention, there is provided an alternator power supplied electric heater wherein the control means sets, in the second state, a target amount of power which is consumed until the object to be heated reaches a predetermined temperature by the resistive heater element, and stops heating of the resistive heating element by the alternator when the amount of power consumed by the resistive heater element exceeds the target amount of power. According to this arrangement, since the control means controls the consumed power to match the target amount of power, the object to be heated can be heated to a predetermined temperature even if the number of engine rotations and the resistance of the resistive heater element vary.

DESCRIPTION OF THE PREFERRED EMBODIMENTS

Embodiment 1

Figure 1:
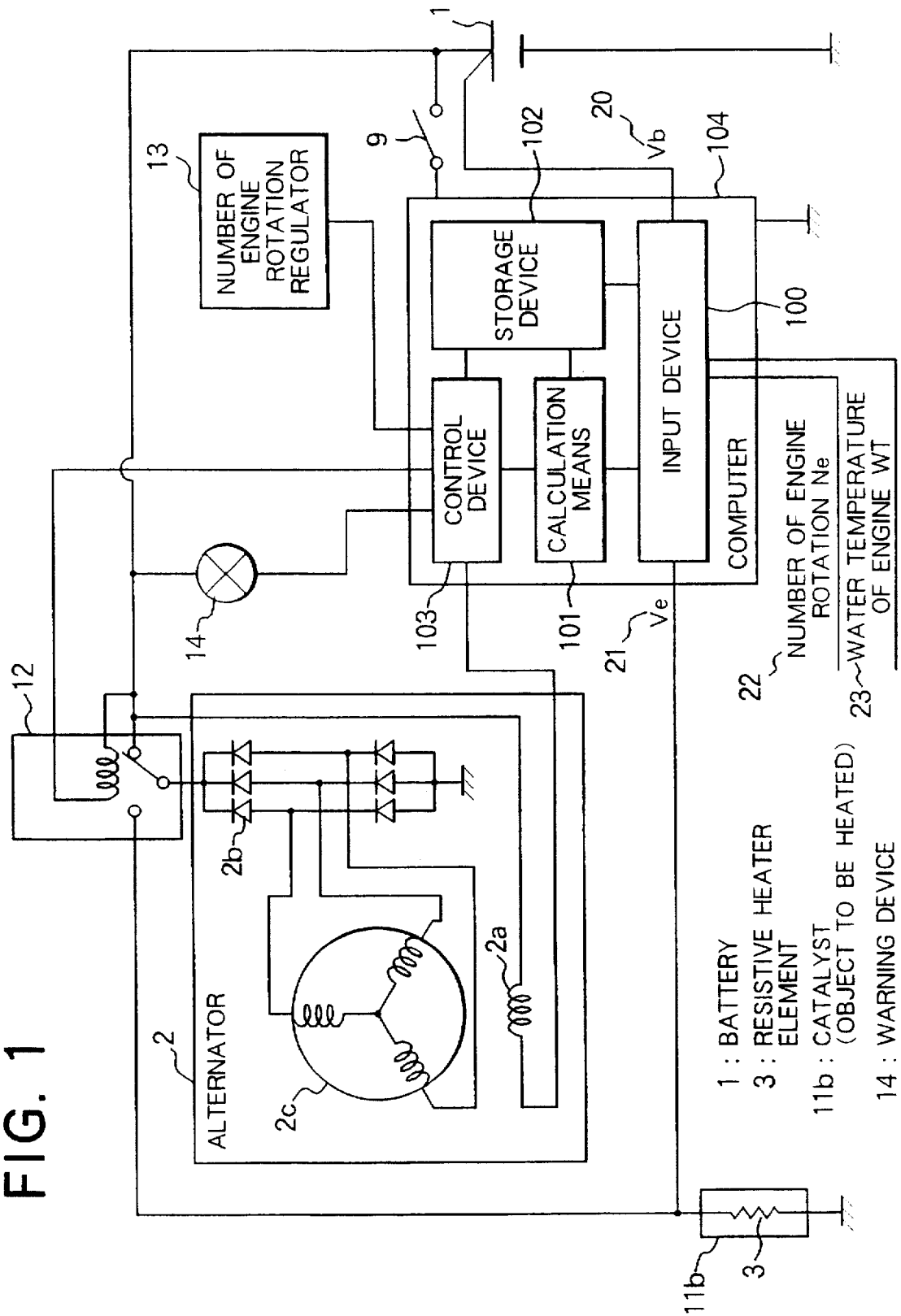
FIG. 1 is a circuit diagram showing Embodiment 1 of the invention.

Now, embodiments of the invention will be explained according to the drawings. FIG. 1 is a circuit diagram showing Embodiment 1 of the invention. As shown in FIG. 1, the alternator power supplied electric heater of this embodiment comprises a battery 1, an alternator 2, a resistive heater element 3, an ignition switch 9, catalyst 11$b$ which is an object to be heated by the resistive heater element 3, a relay 12 for changing over between a first state for connecting the alternator 2 to the battery 1 and a vehicle mounted load (not shown) and a second state for electrically connecting the alternator 2 to the resistive heater element 3, a number of engine rotations regulating device 13 for regulating the number of engine rotations, and a warning device 14.

A computer 104 as an electronic device comprises an input device 100 to which vehicle information is input, a calculation device 101 for calculating information from the input device, a storage device for storing the information from the calculation device and the input device 102, and a control device 103 for controlling each device according to the result of calculation by the calculation device.

Then, used as the vehicle information are battery voltage Vb 20, voltage of the resistive heater element Ve 21, number of engine rotations Ne 22, and water temperature of the engine WT 23.

Figure 2:
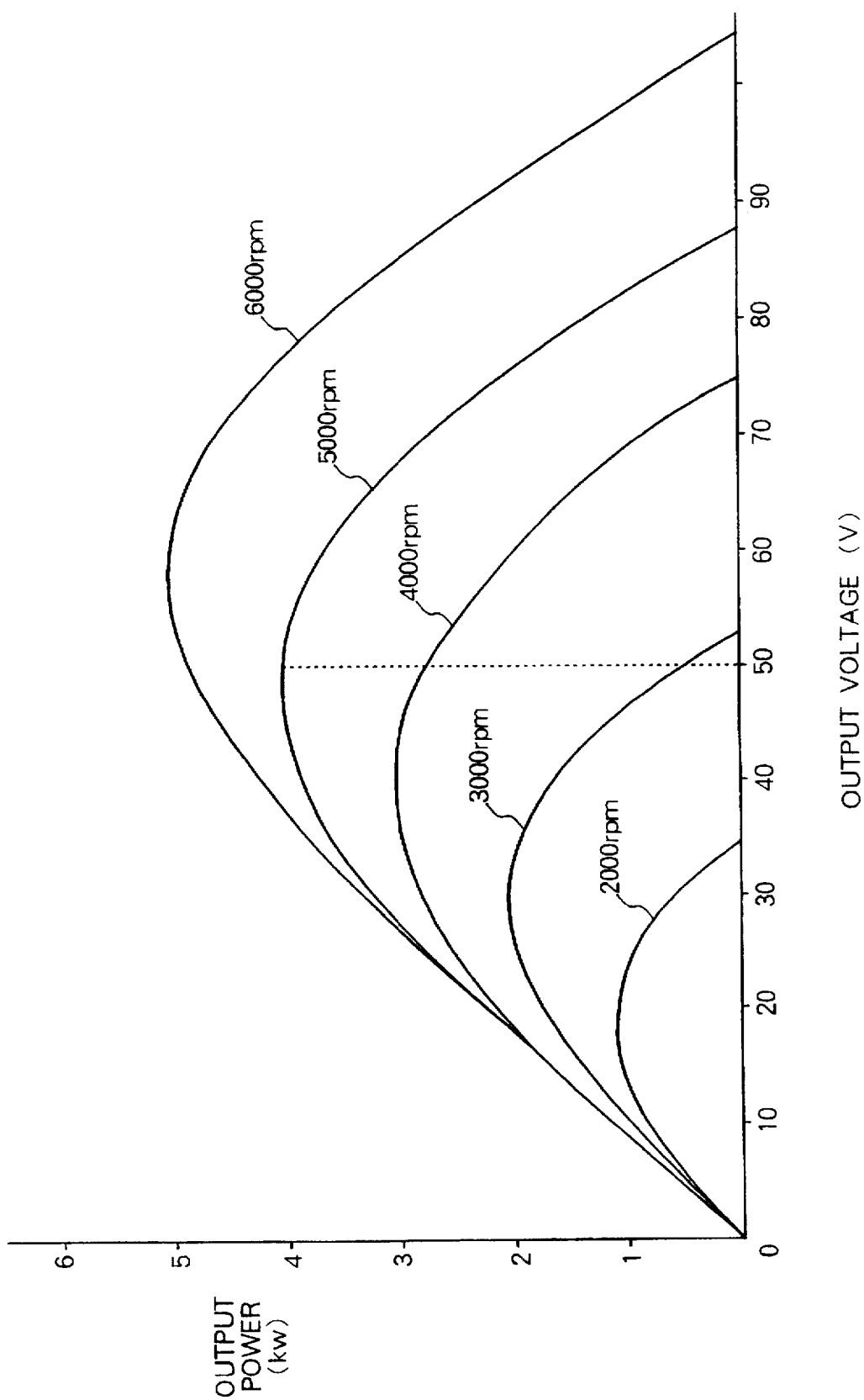
FIG. 2 is a characteristic diagram showing an example of non-controlled characteristics of alternators according to Embodiments 1 and 2 of the invention.

FIG. 2 is illustrates characteristics of the alternator 2 (output characteristics when current corresponding to the voltage of a field coil 2a flows as a power transistor (not shown) for driving the field coil of the alternator 2 is forced to turn on) the axis of abscissa of which represents output voltage (corresponding to voltage of the resistive heater element Ve 21), and the axis of ordinate of which represents output power (corresponding to the consumed power W of resistive heater element 3). Each graph uses the number of engine rotations Ne 22 as a parameter. At the moment, the load connected to the alternator 2 is only the resistive heater element 3 so that a relationship described later is established.

If it is assumed, for example, that the voltage Ve 21 of the resistive heater element 3 which was measured is 50 V, and the number of engine rotation Ne22 is 5,000 rpm, the output power (consumed power W) is 4 kW so that the resistance RL of the resistive heater element 3 is as follows according to the Ohm's law:

$RL=Ve^2/W=0.625 \ \Omega$

Since temperature rise $\Delta t$ of the catalyst 11b can be represented as a function of the characteristic value K of the object to be heated (such as mass M) and the consumed power $\Sigma W$ as follows:

$\Delta t=Kf(\Sigma W)$, the current temperature t of catalyst can be estimated by the following equation from the consumed power $\Sigma W$ and the water temperature Wt the of engine from which the initial value of catalyst ts is estimated $t=ts+\Delta t$.

Figure 3:
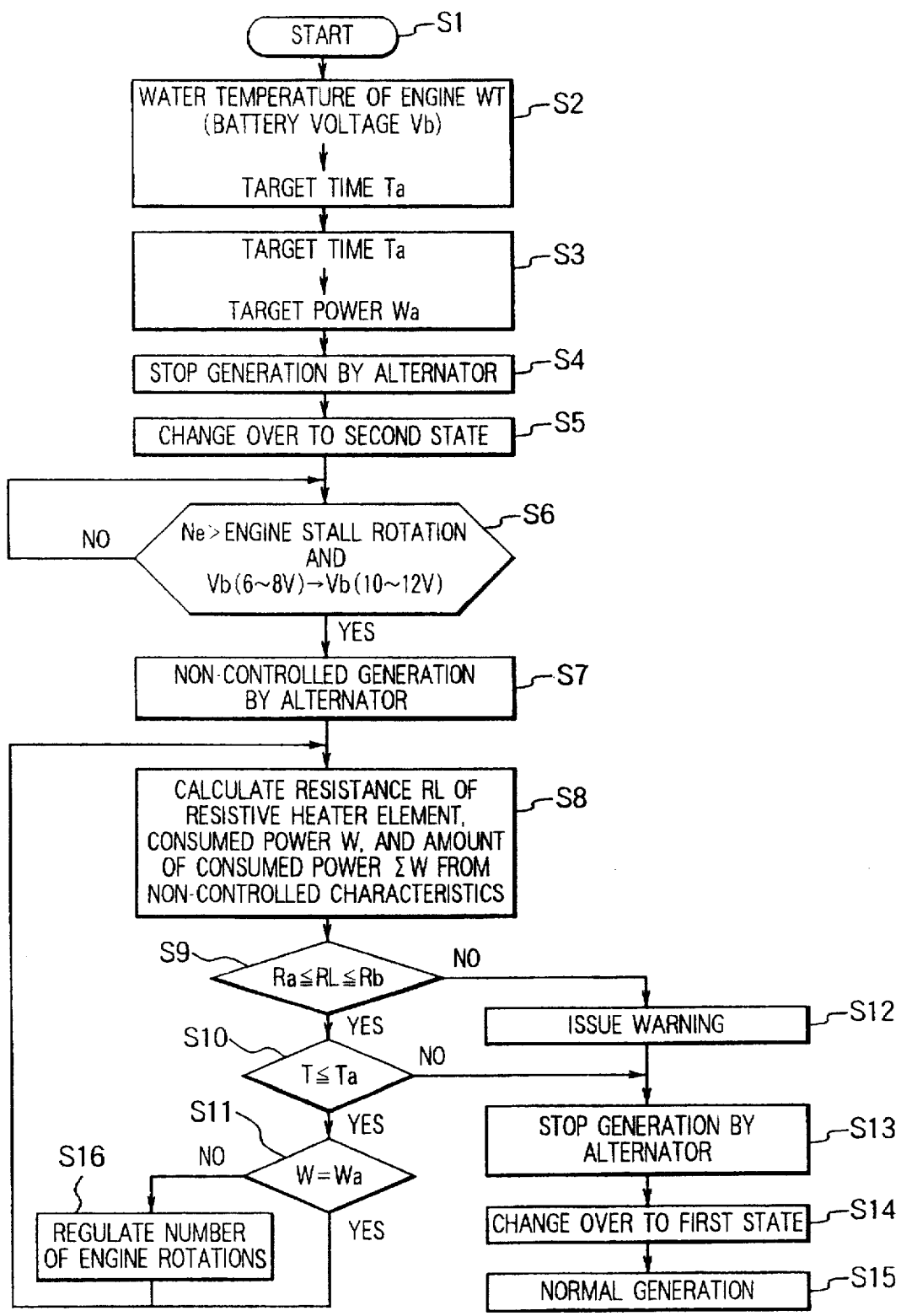
FIG. 3 is a flowchart showing the operation of Embodiment 1 of the invention.

FIG. 3 is a flowchart illustrating the operation of Embodiment 1. The operation of Embodiment 1 is described by using FIG. 3. In the alternator power supplied electric heater arranged as above, when the ignition switch 9 is turned on in step S1, the computer 104 starts to run. In step S2, initial temperature of the catalyst 11b is estimated by the water temperature of the engine WT 23, a candidate for the target time is established for supplying electric power by making the resistive heater element 3 conductive, and a final target time Ta is determined by correcting the target time in accordance with the battery voltage Vb 20.

Here, if the water temperature of the engine WT 23 is, for example, 20° C., the target time as the candidate is set to a time from 20 seconds to 40 seconds. Then, when the release voltage of the battery voltage Vb 20 is 12.5 V, the battery is determined to be fully charged, and the target time is used as the final target time as is. When the release voltage of the battery voltage Vb 20 is 11.5 V which is 20% of charged state, correction is made to reduce the established target time by about 50%, and that value is used as the final target time Ta.

Thus, the charging ratio of the battery can be prevented from being significantly lowered and deteriorated by correcting the target time in accordance with the battery voltage (charged state of the battery).

Then, in step S3, a target amount of power $\Sigma W$ and a target power Wa required to raise the temperature of the catalyst 11b to a target predetermined temperature in the target time Ta are calculated from the target time Ta determined in step S2.

In step S4, the alternator 2 is prevented from generating power by the control device. In step S5, the control device controls the relay 12 to attain the second state where the alternator 2 is electrically connected to the resistive heater element 3.

Here, the engine is rotated by a starter (both not shown), and started to rotate by injection of fuel and ignition. At the moment, in step S6, determination is made whether the battery voltage Vb 20 returns from a state where the voltage is dropped because of driving of the starter (6–8 V) to a state where driving of the starter completes and the voltage Vb 20 is recovered (10–12 V), and whether the number of engine rotations 22 is higher than a predetermined engine stall rotation. The process proceeds to step S7 if the determination is affirmative, or repeats step S6 if negative.

Then, in step S7, the alternator 2 is caused to start the non-controlled power supply. At the moment, gradual excitation may be employed not to apply load on the engine. In step S8, the resistance RL of the resistive heater element 3, the consumed power W, and the amount of consumed power $\Sigma W$ are calculated from the non-controlled characteristics of the alternator 2 shown in FIG. 2.

In step S9, it is determined whether the resistance RL of the resistive heater element 3 is within a predetermined range Ra–Rb. If the resistance RL of the resistive heater element 3 is within the range, the process proceeds to step S10, and if not, the process determines that the resistive heater element 3 is failed, and proceeds to step S12.

In step S10, the time T from the start of non-controlled supply to the alternator 2 in step S7 is compared with the target time Ta. If T≦Ta, the process proceeds to step S11. Otherwise, the process proceeds to step S13.

In step S11, the consumed power W is compared with the target power Wa. If W=Wa, the process returns to step S8. Otherwise, the process proceeds to step S16. In step S12, the driver is warned, and the process proceeds to step S13.

In step S13, the generation by the alternator is stopped. In step S14, the relay 12 is controlled to attain the first state where the alternator 2 is electrically connected to the battery 1. Then, in step S15, the alternator 2 resumes the normal generation state (for example, a state where the alternator 2 is controlled to make the battery voltage Vb20 to 14 V).

If W 32 Wa is not attained in step S11, in step S16, the number of engine rotation is regulated to become higher if W<Wa, and to become lower if W>Wa.

Embodiment 1 has been described for a case where the water temperature of the engine is used as the vehicle information, and the object to be heated is the catalyst, the invention is not limited to such embodiment, but may employ a detection signal from an existing temperature sensor provided for detecting temperature other than the water temperature of the engine (for example, an intake air temperature sensor), and uses it for estimating initial temperature of the object to be heated such as the catalyst. In addition, the object to be heated may be room temperature or window glass in addition to the catalyst.

Moreover, the vehicle information is not necessarily used if the object to be heated is one such as the window glass which is sufficient to be heated to a temperature roughly to remove frost.

Furthermore, since the resistance of the resistive heater element is found according to the invention, if there is a certain relationship between the resistance and its temperature, temperature of the resistive heater element can also be estimated, and the temperature of the object to be heated is controlled in accordance with by the estimated value.

Embodiment 2

Figure 4:
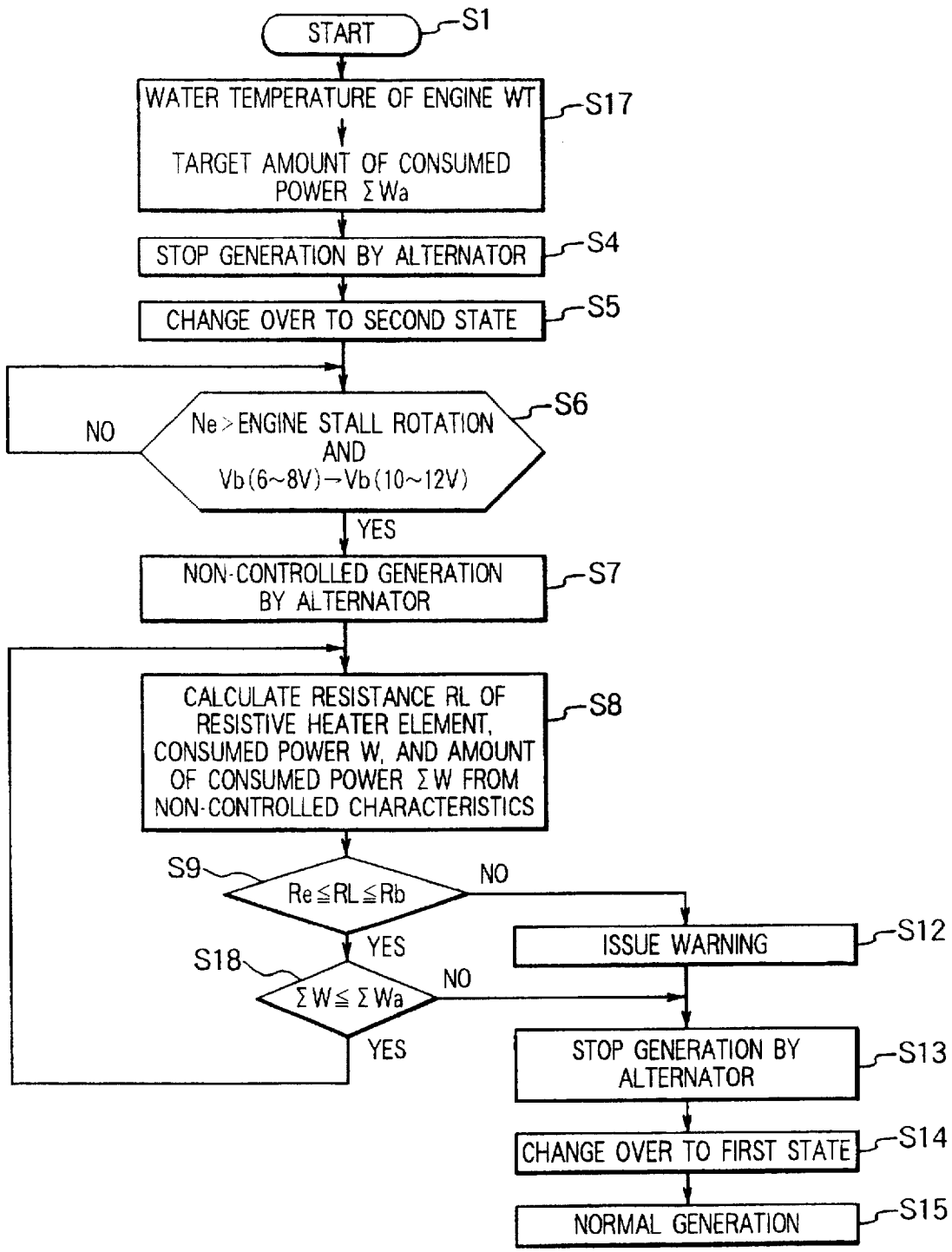
FIG. 4 is a flowchart showing the operation of Embodiment 2 of the invention.
Figure 5:
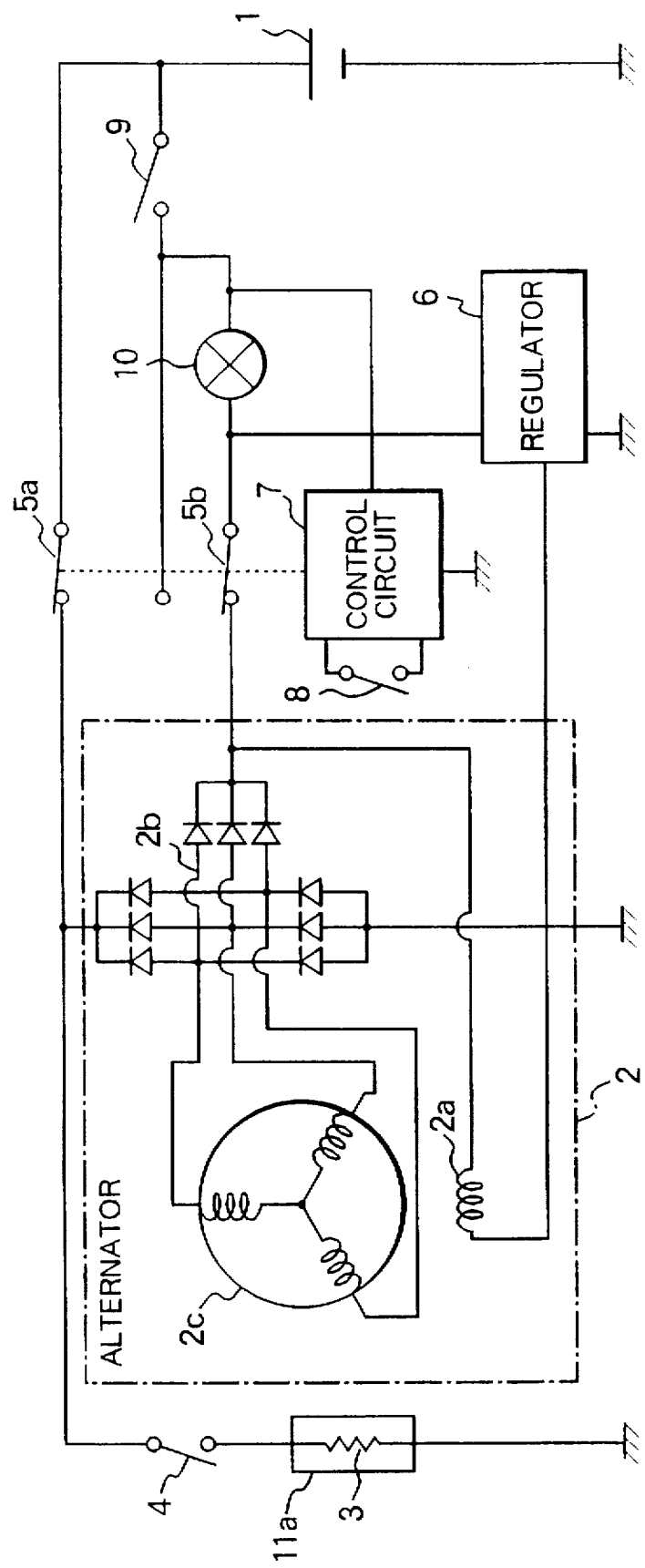
FIG. 5 is a circuit diagram showing a conventional device.

Now, Embodiment 2 of the invention is described. The basic arrangement of Embodiment 2 is same as that shown in FIG. 1. FIG. 4 is a flowchart illustrating the operation of Embodiment 2. In FIG. 4, only different steps are described.

First, in step S1, the computer starts to run. Then, in step S17, a target amount of power with which the object to be heated reaches a target temperature at the water temperature of the engine WT 23 is established as a candidate. This value is corrected by the water temperature of the engine WT 23 as the vehicle information to obtain a final amount of power ΣWa. Then, the process proceeds to step S4 also described for Embodiment 1.

In addition, in step S9, if the resistance RL of the resistive heater element 3 is determined to be within a predetermined range Ra–Rb, the process proceeds to step S18. In step S18, the consumed power ΣW is compared with the target amount of power ΣWa. The process returns to step S8 if ΣW≦ΣWa, and proceeds to step S13 if ΣW>ΣWa.

In the above, while Embodiment 2 has been described, here, it is the same as described for Embodiment 1 in that the water temperature of engine is not necessarily used as the vehicle information.

What is claimed is:

1. An alternator power supplied electric heater comprising:
   an alternator mounted on a vehicle for supplying electric power to a battery and a vehicle mounted load,
   storage means for storing non-controlled characteristics of said alternator,
   a resistive heating element for electrically heating an object to be heated,
   voltage detection means for detecting the voltage of said resistive heating element,
   change-over means for changing operation state between a first state where an output of said alternator is connected to the battery and the vehicle mounted load, and a second state where said output of said alternator is connected to said resistive heating element,
   number of rotation detection means for detecting the number of engine rotations,
   calculation means for determining, in said second state, consumed power of said resistive heating element from the voltage of said resistive heating element, the number of engine rotations, and the non-controlled characteristics of said alternator, and
   control means for controlling, in said second state, supply of power to said resistive heating element based on the consumed power determined by said calculation means so that said object to be heated is heated to a predetermined temperature.

2. The alternator power supplied electric heater as set forth in claim 1, wherein said object to be heated is a catalyst.

3. The alternator power supplied electric heater as set forth in claim 1, wherein said calculation means calculates resistance of said resistive heating element based on the non-controlled characteristics of said alternator and the voltage of said resistive heating element, and determines that said resistive heating element is defective when said resistance exceeds a preset range.

4. The alternator power supplied electric heater as set forth in claim 3, wherein, when said resistive heating element is determined to be defective, said change-over means changes over said alternator from said second state to said first state.

5. The alternator power supplied electric heater as set forth in claim 3, further comprising warning means for warning a driver of a defect in said resistive heating element when said resistive heating element is determined to be defective.

6. The alternator power supplied electric heater as set forth in claim 1, wherein said control means sets, in said second state, a target amount of power which is consumed until said object to be heated reaches said predetermined temperature by said resistive heating element, and stops heating of said resistive heating element by said alternator when the amount of power consumed by said resistive heating element exceeds said target amount of power.

7. An alternator power supplied electric heater comprising:
   an alternator mounted on a vehicle which supplies electric power to a battery and a vehicle mounted load,
   storage means for storing non-controlled characteristics of said alternator,
   a resistive heating element for electrically heating an object to be heated, a temperature of said object being estimated based on vehicle information,
   voltage detection means for detecting the voltage of said resistive heating element,
   change-over means for changing operating state between a first state where an output of said alternator is connected to the battery and the vehicle mounted load, and a second state where the output of said alternator is connected to said resistive heating element,
   number of rotation detection means for detecting the number of engine rotations,
   vehicle information detection means for detecting said vehicle information,
   calculation means for calculating, in said second state, consumed power of said resistive heating element from the voltage of said resistive heating element, the number of engine rotations, and the non-controlled characteristics of said alternator, and
   control means for controlling, in said second state, supply of power to said resistive heating element based on the consumed power calculated by said calculation means so that said object to be heated is heated to a predetermined temperature.

8. The alternator power supplied electric heater as set forth in claim 2, wherein said vehicle information is water temperature of the engine.

9. An alternator power supplied electric heater comprising:
   an alternator mounted on a vehicle which supplies electric power to a battery and a vehicle mounted load,
   storage means for storing non-controlled characteristics of said alternator,
   a resistive heating element for electrically heating an object to be heated, a temperature of said object being estimated based on vehicle information,
   voltage detection means for detecting the voltage of said resistive heating element,
   change-over means for changing operating state between a first state where an output of said alternator is connected to the battery and the vehicle mounted load, and a second state where the output of said alternator is connected to said resistive heating element,
   number of rotation detection means for detecting the number of engine rotations,
   vehicle information detection means for detecting said vehicle information,
   calculation means for calculating, in said second state, consumed power of said resistive heating element from the voltage of said resistive heating element, the number of engine rotations, and the non-controlled characteristics of said alternator, and
   control means for controlling, in said second state, supply of power to said resistive heating element based on the consumed power calculated by said calculation means so that said object to be heated is heated to a predetermined temperature;

wherein, in said second state, said control means sets a target time based on said vehicle information, a target power being calculated from the amount of power with which said resistive heating element reaches said predetermined temperature in said target time, the number of engine rotations being controlled so that the consumed power of said resistive heating element is said target power.

10. The alternator power supplied electric heater as set forth in claim 9, wherein said target time is adjusted in accordance with a voltage of said battery.

11. The alternator power supplied electric heater as set forth in claim 9, wherein said control means stops heating of said resistive heating element after said target time expires, and said change-over means changes over said alternator to said first state.

* * * * *